United States Patent [19]
Snyder

[11] 4,007,848
[45] Feb. 15, 1976

[54] ANTI-MISSILING BOTTLE STRUCTURE

[75] Inventor: William Joseph Snyder, Brockton, Pa.

[73] Assignee: Zapata Industries, Inc., Frackville, Pa.

[22] Filed: May 9, 1975

[21] Appl. No.: 576,207

[52] U.S. Cl. .................................. 215/31; 215/307
[51] Int. Cl.² ...................................... B65D 51/16
[58] Field of Search ............... 215/31, 307, 252; 220/303, 366

[56] References Cited
UNITED STATES PATENTS

| | | | |
|---|---|---|---|
| 2,135,330 | 11/1938 | Desser | 215/31 |
| 2,169,686 | 8/1939 | Fabrice | 215/31 X |
| 2,351,150 | 6/1944 | Sanford | 215/332 X |
| 2,423,295 | 7/1947 | Crabbe | 215/31 X |
| 2,770,382 | 11/1956 | Ritter | 215/31 |
| 3,455,479 | 7/1969 | Hadley | 215/252 |

Primary Examiner—Donald F. Norton
Attorney, Agent, or Firm—Shapiro and Shapiro

[57] ABSTRACT

Pressure relief channels are provided at the neck of beverage bottles of the type having roll-on (twist-off) closures to release gas pressure within the closure promptly as the closure is turned to remove it and before missiling of the closure can occur.

27 Claims, 12 Drawing Figures

ANTI-MISSILING BOTTLE STRUCTURE

BACKGROUND OF THE INVENTION

This invention is concerned with improved containers for pressurized fluids and is more particularly concerned with improvement of beverage bottles to prevent cap-missiling.

A popular type of glass bottle for beer or carbonated beverages has a neck provided externally with about one and one quarter turns of threads. A closure having an internal seal engaging the mouth of the bottle is threaded onto the neck, the closure threads being formed in situ by a device which rolls threads onto the metal side wall of the closure cup, using the glass threads of the bottle as a die. In many cases the neck of the bottle below the threads is formed with a circumferential pilfer-proof band about which the skirt of the cap is rolled to lock the cap to the bottle. The cap may be provided with horizontal and/or vertical lines of weakness in the region of the pilfer-proof band which break when the cap is twisted to remove it.

This type of container has inherently had a potentially serious problem — premature release of the cap, termed "closure-missiling." When the user twists the cap to remove it, 90° of twisting is sufficient to leave only about one turn of thread retaining the cap on the bottle. The initial turning of the cap permits pressurized gas to enter between the side wall of the cap and the bottle, tending to bulge the cap side wall outwardly. The closure has to turn many degrees before venting of the trapped gas can occur. Before this gas can be released to the atmosphere, the pressure build-up in the cap may be sufficient to overcome the tenuous remaining thread engagement and fire the cap into the air like a missile. The potential danger to the user and to bystanders is self-evident.

The broad problem of pressure build-up within bottles or jars and attempts to solve that problem by venting pressurized gas are, of course, not new. See, for example, Moldavsky et al., U.S. Pat. No. 3,433,379. See also U.S. Pat. Nos. 1,739,659 to Spahn; 2,990,079 to Garvey; 2,161,097 to Schroder-Nielsen; 2,144,273 to Raymond; and 1,694,851 to Glass. In general, attempts have been made in the prior art to modify the bottle or jar or the closure to provide safety vents for the release of excessive fluid pressure. However, the prior art is devoid of any teaching or suggestion of a solution to the cap-missiling problem referred to above, where the problem occurs only when the user commences to remove the closure, pressure maintenance being required at all other times.

BRIEF DESCRIPTION OF THE INVENTION

It is accordingly a principal object of the present invention to provide a solution to the closure-missiling problem and to provide improved bottle structures for solving that problem.

A further object of the invention is to provide an improved bottle of the type receiving roll-on closures, whether of the pilfer-proof or non-pilfer-proof type, the conventional bottle structure being modified in a manner which is economical, which does not interfere with the removal of the cap, and which does not encourage chipping of the glass finish.

Briefly stated, in accordance with a preferred form of the invention, a glass pressurized-beverage bottle of the type having a neck provided with about one and one quarter turns of external threads for receiving roll-on closures is provided with one or more (preferably several) venting channels extending across at least one thread turn and/or extending into or across the pilfer-proof band or reinforcement bead at the neck of the bottle. The dimensions of the venting channels are selected to avoid appreciable indentation of the side wall of the metal cap when the threads are formed, which otherwise would interfere with the removal of the cap and block the vents, and to avoid chipping of the glass edges. The venting channels terminate short of the mouth region of the bottle, so as not to interfere with the desired seal. Nevertheless, when the user commences to turn the closure in a direction to remove it, the venting channels provide sufficient release of gas from within the closure sufficiently early in the cap removal operation to prevent closure-missiling.

BREIF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 1:
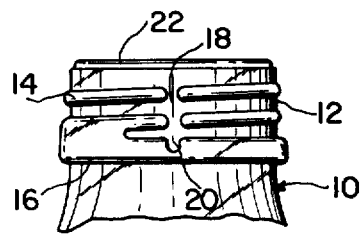
FIGS. 1 – 9 are fragmentary side elevation views illustrating different embodiments of the invention.

Referring to the drawings, and initially to FIG. 1 thereof, the invention will be described with reference to its principal application to a glass bottle 10 for containing beer or carbonated beverages. Typically the invention may be applied to a G.C.M.I. 1625 series glass finish bottle commonly employed with roll-on closures for containing beer or carbonated soft drinks, but the broader aspects of the invention are applicable to other types of containers as well.

Figure 2:
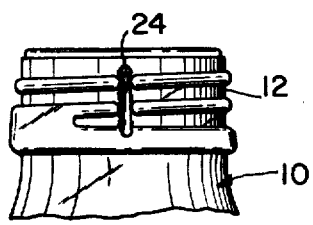
Figure 12:
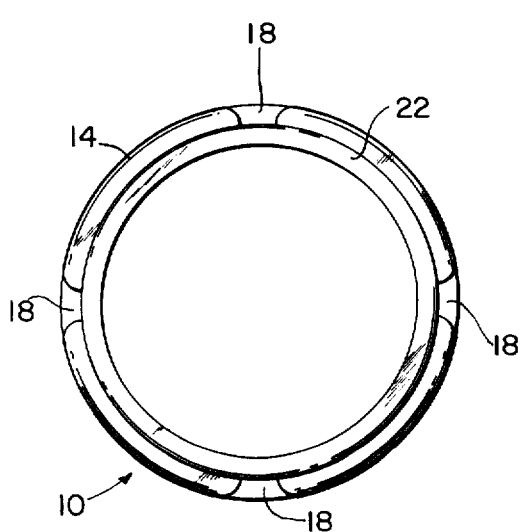
FIG. 12 is an enlarged top plan view of the embodiment of FIG. 1.

As shown in FIG. 1, the neck 12 of the bottle 10 is provided with a plurality of integral, external, circumferential beads, including about one and one quarter turns of threads 14 and a pilfer-proof cap-locking band 16 below the threads. This structure per se is conventional. In accordance with the invention a venting channel 18 is provided, and in the form shown the venting channel extends transversely through more than one turn of the threads and into the locking band 16, as indicated at 20. The venting channel 18 in the form, and in the other forms to be described hereinafter, preferably terminates short of the mouth 22 of the bottle by about one thirty-second to about one-sixteenth inch. The channel may be defined merely by the interruption of one or more thread turns and/or a notch in the pilfer-proof band, as shown in FIG. 1, or, as shown in FIG. 2 the channel may be further defined by a depression 24 in the glass finish, so that the channel depth is greater than the thread depth, or the band depth. The edges of the circumferential beads where interrupted wholly or partially by the venting channel are preferably smoothly rounded, and if the venting channel extends into the band 16, it preferably terminates short of the lower edge of the band by about one thirty-second of an inch. The width of the venting channel is preferably about one-sixteenth inch and the depth perpendicular to the neck surface about one thirty-second to about one-sixteenth inch, although this may vary somewhat depending upon the number of venting channels used. Preferably two to four such channels are provided spaced about the circumference of the bottle neck as shown in FIG. 12. By virtue of the aforesaid dimensioning of the venting channels, indenting of the cap side wall into the venting channels is minimal when the threads are rolled on, thereby avoiding interference with the removal of the cap and avoiding blockage of the venting channels. This is to be contrasted with prior art bottles and jars in which threads are interrupted by wide spaces receiving cap protrusions with the specific purpose of locking the cap onto the bottle.

The venting channels must have sufficient cross-sectional area to release pressure build-up within the cap rapidly during the initial turn-off movement of the cap, and before appreciable disengagement of the threads, if cap missiling is to be avoided. In practice, it has been discovered that substantial release of gas pressure within the cap occurs before the cap has been turned 90° and preferably within the initial 10 to 20° of cap movement if missiling is to be avoided, although some venting may also occur later.

Figure 10:
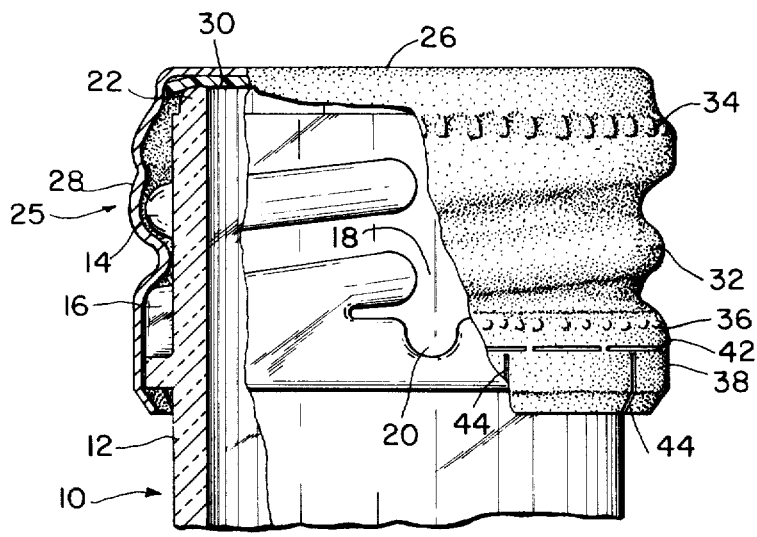
FIG. 10 is an enlarged partly sectional elevation view illustrating a closure applied to a bottle incorporating one form of the invention.

FIG. 10 illustrates a closure 25 applied to the bottle 10. The closure comprises a cup with a top wall 26 and an integral malleable side wall 28 and is conventionally formed of an aluminum alloy. A seal liner or ring 30 secured within the cap adjacent to the top wall 26 engages the mouth 22 of the bottle to prevent the release of pressure when the bottle has been filled with a pressurized fluid and threads 32 have been rolled onto the cap side wall, using the glass threads of the bottle as a die in the well known manner. In the form shown, the cap has upper and lower knurled beads 34 and 36 and the skirt is provided with a locking ring 38 rolled under the locking band or collar 16 of the bottle. If desired, one of the knurled beads may be omitted. Conventional horizontal and vertical lines of weakness (lances) are provided at 42 and/or 44 to break the locking engagement of the cap with the bottle when the cap is twisted to remove it.

Figure 11:
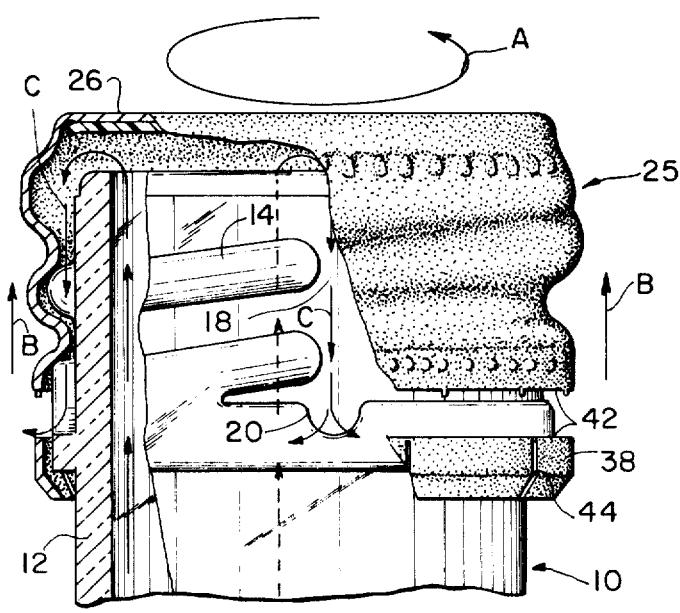
FIG. 11 is a similar view illlustrating the relationship of the closure to the bottle and the venting of gas as the closure is turned initially to remove it.

FIG. 11 illustrates what happens when the cap is twisted to remove it, counterclockwise twisting being indicated by arrow A and resultant upward movement of the cap relative to the bottle by arrows B. In the form shown the cap breaks along the line of weakness 42. Also, ring 38 may become detached from the bottle by breakage of one or more of the lines of weakness 44. Almost as soon as the cap commences to turn, gas released from the mouth of the bottle enters between the sidewall of the cap and the neck of the bottle, and in the absence of the venting channels of the invention the pressure may be sufficient to fire the cap from the bottle when the threads have been only partially disengaged. However, with the venting channels of the invention, before this can occur the gas pressure within the cap is released to the atmosphere by flow of gas along the venting channels, as indicated by arrows C. The gas flows to the atmosphere beneath the severed skirt of the cap, and/or through slits formed at lines of weakness 44. Cap-missiling is thus prevented.

Although gas which flows from the bottle and into the space between the cap side wall and the bottle neck will eventually find release to the atmosphere even without the invention, the engagement of the cap threads with the bottle threads traps the gas and prevents rapid dissipation of pressure within the cap until the threads are disengaged to a degree which permits missiling. With the invention, on the other hand, short, direct, rapidly available venting channels provide prompt release of gas pressure within the cap and avoid missiling.

Figure 3:
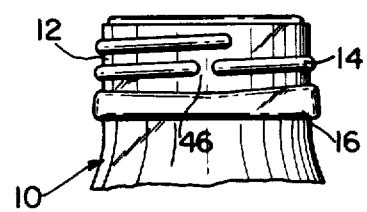
Figure 4:
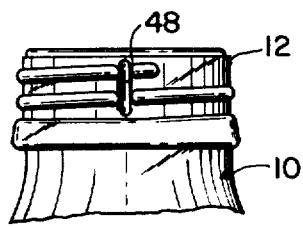
Figure 5:
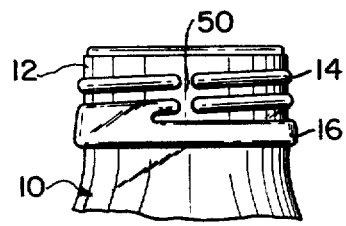
Figure 6:
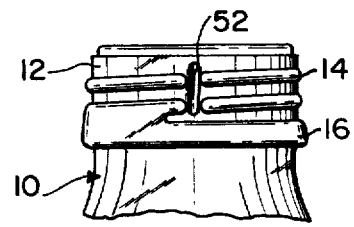
Figure 7:
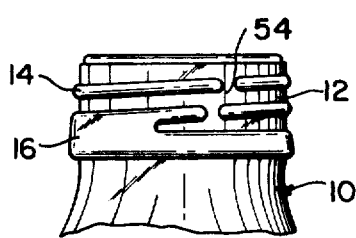
Figure 8:
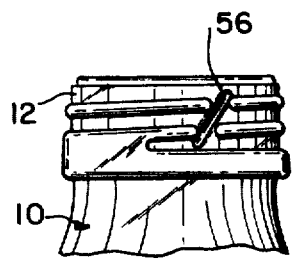
Figure 9:
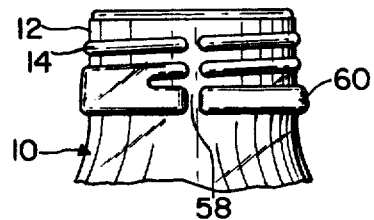

FIGS. 3–9 illustrate other embodiments of the invention. In FIG. 3, the venting channel 46 (as in all embodiments there are preferably several such channels) interrupts only one turn of the threads and does not extend into the locking band 16. In FIG. 4 the venting channel 48 interrupts more than one turn of threads, and is also depressed below the usual surface of the neck. In FIG. 5, the venting channel 50 interrupts more than one turn of the threads but is not depressed. A similar structure, but with depression, is shown at 52 in FIG. 6. Other non-depressed and depressed venting channels, 54 and 56 are shown in FIGS. 7 and 8, respectively. It will be noted here that the venting channels are inclined rather than parallel to the axis of the bottle, as in other embodiments. FIG. 9 illustrates an embodiment similar to FIG. 1 but in which the venting channel 58 completely interrupts the band 60, which may be a reinforcement band, for example, rather than a pilfer-proof band. This embodiment is especially useful with closures that do not have a horizontal line of weakness above the pilfer-proof ring of the closure, to insure adequate prompt venting when the closure is turned to remove it. Ideally, for universal application to glass beverage bottles for use with all roll-on closures with or without a pilfer-proof ring, it is preferred that the glass finish have notches or grooves forming venting channels both in the thread and locking band (or reinforcement) area, with the channels preferably parallel to the axis of the bottle.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. An improved container of the type having a neck provided externally with circumferential beads including threads for receiving a threaded cap to contain pressurized fluids, the improvement comprising means including at least one venting channel extending transversely into at least one of said beads for providing release of fluid pressure from beneath said cap sufficient to prevent missiling of the cap when the cap is initially turned to remove it from said container, the channel traversing at least one of the turns of the threads, the depth of the channel perpendicular to the surface of the container being greater than the thread depth.

2. A container is accordance with claim 1, wherein the container is a glass bottle of the type receiving a roll-on cap for containing carbonated beverages, and wherein said threads are limited to about 1¼ turns.

3. A container in accordance with claim 1, including a plurality of said channels, each with a width about one-sixteenth inch, spaced about the circumference of said neck and extending along the length of said neck.

4. A container in accordance with claim 3, wherein said channels terminate short of the mouth of said container by about one thirty-second to one-sixteenth inch.

5. A container in accordance with claim 1, wherein said channel traverses more than one turn of said threads.

6. A container in accordance with claim 1, wherein one of said beads is a cap locking band beyond said threads and wherein said channel extends into said locking band.

7. A container in accordance with claim 1, wherein said means provides said release within 90° turning of said cap to remove it.

8. A container in accordance with claim 1, wherein said means provides said release within about 10° to 20° turning of said cap to remove it.

9. An improved container in accordance with claim 1, wherein said channel terminates short of the mouth of said container by about one thirty-second to one-sixteenth inch.

10. In combination with a bottle of the type having a neck provided externally with circumferential beads including threads and a rolled-on threaded cap arranged to seal against the mouth of the bottle to contain pressurized beverages and the like, means including a venting channel extending transversely into at least one of said beads for releasing fluid pressure from beneath said cap sufficiently to prevent missiling of said cap when said cap is turned to remove it from said bottle, the channel traversing at least one of the turns of said threads, the depth of said channel perpendicular to the surface of said container being greater than the thread depth.

11. A combination in accordance with claim 10, wherein said channel is about one-sixteenth inch wide.

12. A combination in accordance with claim 11, wherein said channel terminates short of the mouth of said container by about one thirty-second to about one-sixteenth inch.

13. A combination in accordance with claim 10, including a plurality of said channels spaced about the circumference of said neck.

14. A combination in accordance with claim 10, wherein said threads are limited to about 1¼ turns.

15. A combination in accordance with claim 14, wherein said channel traverses more than one turn of said threads.

16. A combination in accordance with claim 10, wherein one of said beads is a cap locking band beyond said threads and wherein said channel extends into said locking band.

17. A combination in accordance with claim 10, wherein said channel is substantially unobstructed along its length when the cap threads have been rolled onto said bottle.

18. A combination in accordance with claim 10, wherein said means provides said release within 90° turning of said cap to remove it.

19. A combination in accordance with claim 10, wherein said means provides said release within about 10° to 20° turning of said cap to remove it.

20. A combination in accordance with claim 10, wherein said channel terminates short of the mouth of said bottle by about one thirty-second to one-sixteenth inch.

21. An improved bottle of the type having a neck provided externally with circumferential beads including about 1¼ turns of threads for receiving a roll-on threaded cap to contain pressurized beverages and the like, the improvement comprising at least one venting channel extending transversely into at least one of said beads and having a width of about one-sixteenth inch, the channel also extending through at least one turn of the threads, the depth of said channel perpendicular to the surface of said container being greater than the thread depth.

22. An improved bottle in accordance with claim 21, including a plurality of said channels spaced about the circumference of said neck and extending along the length of said neck.

23. An improved bottle in accordance with claim 22, wherein said channels extend through at least one turn of said threads.

24. An improved bottle in accordance with claim 22, wherein said channels terminate short of the mouth of said bottle by about one thirty-second to one-sixteenth inch.

25. An improved bottle in accordance with claim 21, wherein one of said beads is a cap locking band and said channel extends into said band.

26. An improved bottle in accordance with claim 25, wherein said channel extends into a side of said band adjacent to said threads but terminates short of the opposite side of said band by about one thirty-second inch.

27. An improved bottle in accordance with claim 21, wherein one of said beads is a band beyond said threads remote from the mouth of said bottle and said channel traverses said band.

* * * * *